United States Patent [19]
Moore

[11] 3,835,999
[45] Sept. 17, 1974

[54] SCREEN UNITS USED FOR DEWATERING AND CLASSIFYING THE CONTENTS OF A LIQUID SLURRY

[75] Inventor: William P. Moore, Springfield, Ohio

[73] Assignee: The Bauer Bros. Co., Springfield, Ohio

[22] Filed: Oct. 18, 1972

[21] Appl. No.: 298,476

[52] U.S. Cl.............. 209/251, 209/260, 209/281, 210/237, 210/407
[51] Int. Cl.............................................. B07b 1/28
[58] Field of Search .......... 210/232, 409, 407, 237; 209/274, 281, 251, 260

[56] References Cited
UNITED STATES PATENTS

| | | | |
|---|---|---|---|
| 2,748,941 | 6/1956 | Lontein et al. | 209/274 X |
| 2,814,388 | 11/1957 | Lontein et al. | 209/251 |
| 3,007,574 | 11/1961 | De Koning | 209/251 |
| 3,344,919 | 10/1967 | Leeman | 209/281 X |
| 3,402,816 | 9/1968 | Taylor | 209/260 |
| 3,452,876 | 7/1969 | Ginaven | 210/409 |

FOREIGN PATENTS OR APPLICATIONS

| | | | |
|---|---|---|---|
| 1,202 | 0/1879 | Great Britain | 209/260 |

Primary Examiner—Theodore A. Granger

[57] ABSTRACT

Dewatering and classifying apparatus embodying a screen, presenting an inclined, preferably multi-planar, flow surface. The screen has an unique hinged support at its lower end which facilitates its mount and selective disposition for ease of maintenance and use and its readily interchangeability, as and when required.

17 Claims, 5 Drawing Figures

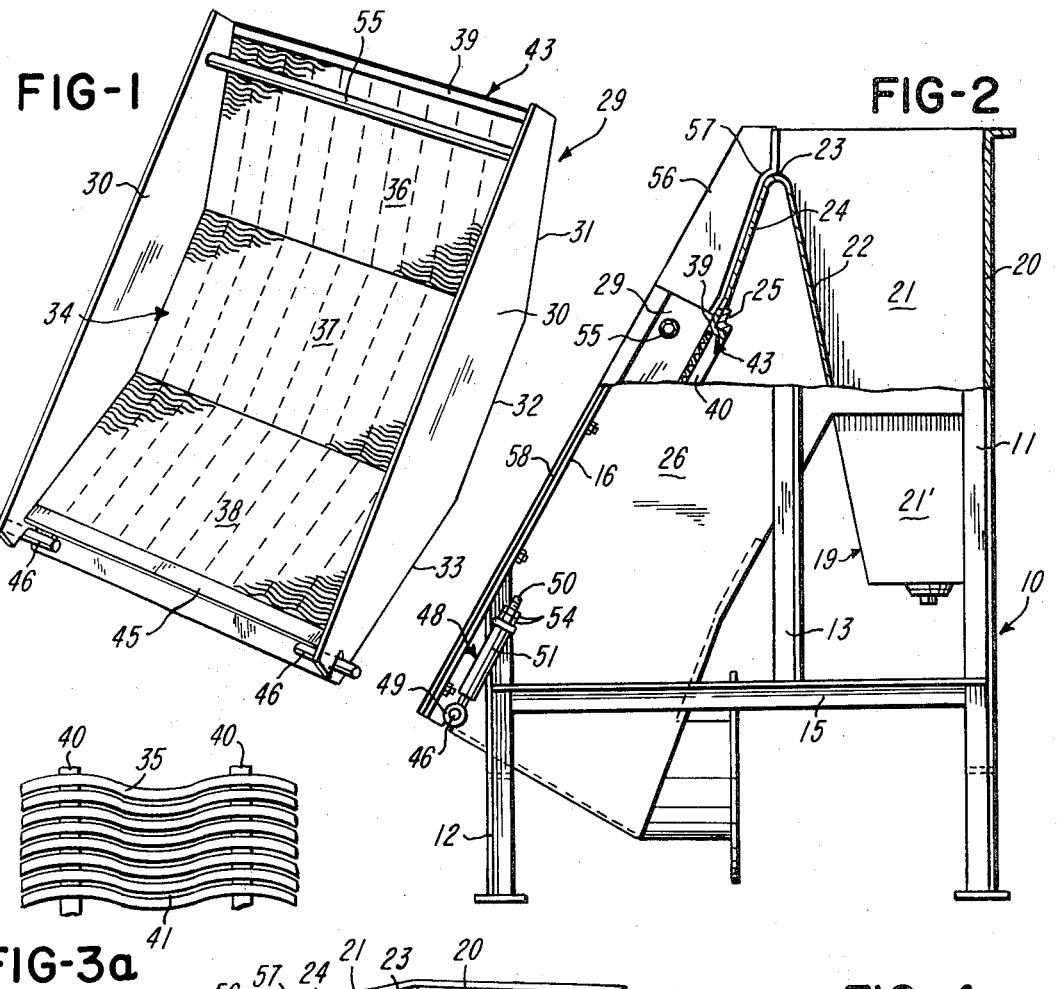

SCREEN UNITS USED FOR DEWATERING AND CLASSIFYING THE CONTENTS OF A LIQUID SLURRY

BACKGROUND OF THE INVENTION

This invention relates to improvements in dewatering, classifying and like apparatus and provides a screen assembly useful for separating waste or pulp solids from an entraining slurry. It has particular advantage for use on slurries which embody sticky adherent substances.

The art to which the invention relates contains a recent development enabling devices capable of accepting a large volume slurry flow and rapidly separating therefrom a substantial fraction of its fluid content. This development, as shown in U.S. Pat. No. 3,452,876, enables a thin pulp or other solid content slurry to be directed over an inclined screen unit in a flat stream, with fluid and fine solid particle content adjacent the screen surface being induced to follow the form thereof and to escape therethrough while larger fibrous or other solid particles, now in a relatively thickened slurry form, continue on over and discharge from the screen unit at its lower end. Dewatering devices of this type have proven to have exceptional capability of fluid separation and are now in general use for a variety of applications. In certain applications, however, such as in meat packing, tanning and in sewage treatment, problems can be experienced in their use. Such problems normally relate to the removal and replacement of a screen unit and its maintenance, due primarily to a frequent need for a cleaning of its back or underside. For example, in the meat packing industry there are applications where the entrails of animals and their body fluid, including water, may be passed over a screen unit to separate the fluid from the solid content. As the fluids escape through the screen unit, they do embody finely divided solids of a fatty, sticky nature, which solids tend to collect and adhere rather tightly to the underside of the screen with obvious undesirable effects. Such effects include a reduction of open screen area and interference with the normal separating capabilities of the screen unit. Similarily, in a tanning operation, the screen units may be applied to solids and entraining liquid constituting waste from a tanning operation. In this instance the substance is hot and the nature of the operation is intermittent in respect to use of the screen unit. During the times intermediate the use of the screen unit there is an evaporation which results in a glue-like deposit on the screen, particularly to its underside. The growth and adhesion of this adherent material is thought to be accelerated by the presence of bacteria. In any event, the screen units employed are rendered less effective and not only rapidly reduced in efficiency but produce undesirable odors. As a result, there must be a frequent removal or cleaning of the screen unit in place, either of which is very difficult. In the latter case, access to the underside of a screen unit as normally embodied in its frame has been awkward and the whole operation has in any event been unwieldy and time consuming.

Accordingly, devices of the prior art used for the purposes described have many times the disadvantages of being subject to excessive "down" time and their useful time has been substantially reduced.

SUMMARY OF THE INVENTION

The present invention obviates the above noted problems in the use of dewatering and classifying screen units and simplifies their construction. Moreover, it improves the reliability factors in use of such screen units and facilitates their handling and maintenance while at the same time minimizing their down time, particularly in applications of the type above described.

In its preferred embodiment, the apparatus of the present invention utilizes a screen unit the working surface of which is rigid and has defined therein a plurality of planes offering a successively inclined flow path. It features a simplified mount of such screen unit in a supporting frame by adjustable suspension means to which the screen unit may be substantially slip fit at its lower end. The suspension means provides a hinge type pivoted mount of the screen unit which enables it to be rocked in its supporting frame to and from an upwardly inclined operating position. When cleaning or replacement of the screen unit is required, one need simply lift this screening unit by a simple means provided at its upper end and dispose it in a generally upright or cast over position wherein the underside is fully exposed for cleaning and maintenance purposes.

It is therefore an object of the present invention to provide a dewatering and classifying screen unit which is simple to fabricate, more efficient and satisfactory in use, adapatable to a wide variety of applications and unlikely to malfunction.

Another object of the invention is to provide a screen assembly useful in difficult dewatering and classifying operations having an improved mount which facilitates its application to and removal from its supporting structure and enables a selective disposition thereof to meet the needs of its use and maintenance in a simple and effective manner.

Another object of the invention is to provide an improved screen assembly wherein a rigid screen unit is provided with a flow surface of multi-planar configuration and the screen unit is supported by a suspension means in connection with and hinging the screen unit at its lower end.

An additional object of the invention is to provide an improved screen unit for dewatering and classifying purposes possessing the advantageous structural features, the inherent meritorious characteristics and the means and mode of use herein described.

With the above and other incidental objects in view, as will more fully appear in the specification, the invention intended to be protected by Letters Patent consists of the features of construction, the parts and combinations thereof, and the mode of operation as hereinafter described or illustrated in the accompanying drawings, or their equivalents.

Referring to the drawings wherein is shown one but not necessarily the only form of embodiment of the invention:

FIG. 1 is a perspective view of a screen unit as provided by the present invention;

FIG. 2 is a side elevation view, partly in section which illustrates the screen unit of FIG. 1 as embodied in a supporting frame structure;

FIG. 3 is a perspective view of the assembly illustrated in FIG. 2 and FIG. 3a is a fragmentary section of the screen; and FIG. 4 is a fragmentary view detailing the suspension means for the screen unit of FIG. 1.

DETAILED DESCRIPTION OF THE PREFERRED EMBODIMENT SHOWN IN THE DRAWINGS

The invention embodiment here illustrated comprises a support structure constituted by a frame 10. The frame 10 includes 3 pairs of posts 11, 12 and 13, each pair being of different height. The posts 11, which are the longest, form the rear corners of the frame 10 while the posts 12, which are considerably shorter, form its forward corners. Adjacent and spaced from their bottom, posts 11 are interconnected by a horizontal brace bar 14. Adjacent and spaced from their bottom, posts 12 are interconnected by a horizontal brace bar 9. The posts 11 and 12 to either side of the frame 10 are similarly interconnected by a brace bar 15.

The third pair of vertical posts 13 seat respectively at their bottoms to the bars 15 to either side of the frame 10. They project vertically in a relatively adjacent, spaced, parallel relation to the rear posts 11. The upper ends of the posts 13 lie in a plane commonly occupied by the upper ends of the posts 11.

Side plates 26 which line the inner side portions of the framework 10 includes a generally rectangular upper portion 21 extending between and bridging the upper end portions of the posts 11 and 13 and a downwardly inclined generally rectangular portion extending from the posts 13 to and beyond the upper end portions of the posts 12. Each of the uppermost edge portions of the plates 26 has formed integral therewith an outwardly bent right angled flange 16. The flanges 16 are coextensive with the plates 26 and due to the configuration of these plates include horizontal portions at their upper extremities which seat on the upper ends of the posts 11 and 13 at the adjacent sides of the framework 10 and downwardly inclined portions which seat at the lower ends on top of the respective posts 12. The posts 11, 12 and 13 are suitably secured to the flanges 16, preferably by welding. The posts 11 to the rear of the framework 10 are bridged by an imperforate plate 20 which is welded thereto and to the upper rearmost extremities of the side plates 26. The uppermost edge of the plate 20 includes a right angled outwardly directed flange which bridges the framework and interconnects at its respective extremities to the rearward and upper limits of the flanges 16 on the side plates 26.

Within the limits of the rectangular area at the top of the framework 10 defined by the upper ends of the posts 11 and 13 is a receptacle 19. The back wall of the receptacle is defined by the aforementioned plate 20 and the upper portions of its side walls are defined by upper portions 21 of the side plates 26. The side walls are completed by plate extensions 21' welded to depend from the lower limits of the plate portions 21. The receptacle 19 includes a front wall 22 which is sloped to incline forwardly from the back plate 20 and formed to have its upper end terminate short of the top of the upper limits of the side plates 26, at which point the front wall 22 is extended in a convex arc form 23 which positions in part in the plane defined by the posts 13, below their upper ends. An integral plate extension of the arcuate portion 23 is directed downwardly and forwardly of the posts 13, between the side plates 26, to form an inclined apron 24. The apron 24 overlaps one side portion of a bar 25 which extends transversely of the frame 10 between the side plates 26. The receptacle is completed by a plate portion 22' which bridges the side plates 21' at their bottoms and interconnects with the back plate 20 and the front wall 22. Of course, the elements forming the receptacle are suitably interconnected by welding or like means to insure that the seams of the receptacle are water tight. Note that the bottom of the receptacle is provided with a drain hole, suitably plugged.

A separable screen unit 29 is releasably mounted to the frame structure above described, being disposed between the side plates 26 to have one end overlap the said one side portion of the bar 25 to form an extension of the apron 24 and its other end terminate beyond but close to the posts 12, adjacent but spaced from their lower ends. The connection between the frame structure and the screen unit 29 will be further described. As for the detail of the screen unit itself, the same has a trough like form, including side walls 30. The upwardly facing edges of the side walls 30 occupy a single, common plane and are directed in straight lines. In contrast the lower edges of the walls 30, which are identically formed, include, from one end to the other, successive angularly and relatively inclined sections 31, 32 and 33. Each of these sections have a straight line form and define successively inclined planes which preferably have a successive ten degree departure from the line of the preceding section. The side walls 30 are parallel and have their lower edges transversely aligned and interconnected by a screen formation 34 the flow surface of which is defined by transversely disposed, longitudinally spaced bars 35. The bars 35 extend between the lower edges of the side plates 30 to follow, in a longitudinally directed sense, the lines thereof. Connections are provided between the ends of the screen bars 35 and the side plates. This construction provides that the bars 35 define a flow surface including successive planar sections 36, 37 and 38, each section lying in a different plane with each successive plane inclining to the preceding plane.

In turn, intermediate the side plates 30, the bars 35 surmount laterally spaced apart longitudinally extending support or brace bars 40. The bars 40 are bent correspondingly to the line of the flow surface to have successively inclined sections in underlying relation to the successively inclined sections of the bars defining the flow surface of the screen unit.

As may be seen, the bars 35 and 40 provide the screen unit with slots 41. For optimal use in certain applications the bars 35 may have a wave like configuration to provide that the slots 41 will have an arcuate form and the apex of the arcuate formations thereof will be directed in the sense of flow across the screen surface. It is noted that there is in bridging relation to the side plates 30, at the end of the screen flow surface which will constitute its upper end, a cross bar 43 having a right angle configuration, one portion 39 of which extends the screen flow surface.

Cross bar 43 interconnects with the adjacent ends of the longitudinally extending support or brace bars 40. The right angled projected portion 39 thereof at its upper edge is adapted in the mounting of the screen unit to overlap the bar 25 and to abut and form a continuation of the apron 24.

The lower end of the screen flow surface is defined by the upper surface of a section 45 of angle iron, which interconnects with the ends of the bars 40 remote from the bar 43. To either extremity of the face of the bar 45 constituting the lowermost end of the screen unit when disposed in its operating position is welded a hinge or pivot pin 46 which projects laterally outward of the screen unit through a suitably provided notch in the projected end of the adjacent side plate 30. These pivot pins 46 are adapted to be received in notches 47 in the lower extremities of the frame side plates 26 and to project beyond the side plates 26 to interengage with eye-bolt type suspension devices 48. Each of the devices 48 includes a circular eyelet portion 49 which accommodates the thrust therethrough of a pin 46. The relation between the eyelet 49 and the pin 46 is one which affords a relative pivot motion or a rotary motion of one relative the other. Each eyelet 49 has integral therewith a shank or bolt portion 50 which is directed radially of the eyelet and externally threaded. The bolt portion 50, in each case, is projected freely through a sleeve 51 secured to the adjacent post 12 of the frame structure 10. Beyond the sleeve 51 the threaded portion of the bolt shank receives a washer and two hex nuts 53 and 54. By suitable adjustment of the related nuts, the eyelets 49 can be raised or lowered in an obvious manner to provide a predetermined required position for suspension of the screen unit through the medium of the pins 46 at its lower end.

It will be observed that once the pivot pins 46 are engaged in the eyelets 49, the bolt shanks 50 thrust through sleeves 51 and the washer and hex nuts 53 and 54 applied, the screen unit can be swung over between the side plates 26 and have the projection 39 on its upper end seat to the bar 25, whereby the screen flow surface merges with and forms a continuation of the apron 24.

A pipe like member 55 transversely bridges and interconnects with the side plates 30 in a position adjacent and spaced over the upper end of the screen flow surface in its inclined operating position. The member 55 may be simply utilized to readily pivot the entire screen unit in respect to its suspension type support means 48 whereby to facilitate a ready access to the back of the screen unit, including the bars 35 and 40 thereof, for simple inspection and/or cleaning in an exceedingly rapid and efficient manner.

To insure an effective seal between the side plates 26 and the adjacent sides of the screen unit 29 and apron 24, the respective adjacent inner sides of the plates 26 are capped by right angled cover elements 56 and 58. The elements 56 and 58 are releasably secured in place in a manner that they can be quickly applied to the invention structure when the screen unit 29 assumes an operative position. Referring to FIG. 3 of the drawings, it may be seen that the upper sealing or capping elements 56 include flange portions which superpose on flange portions 16 to either side of the apron 24 and plate portions which depend along the inner sides of the plates 26, the lower depending ends of which are each capped by a U-shaped sealing strip 57 which seats against and over the adjacent lateral extremity of the apron 24. In the case of the capping or sealing elements 58, they also include flange portions, in this case forming a continuation of the flange portions of the elements 56 and overlapping the lower inclined portions of the flange 16. Plate portions of the elements 58 lie on the inner sides of the plates 26 and seat over the upper edges of the side plates 30 of the screen unit 29 to provide abutting seals at the point of contact. As will be obvious, the elements 56 and 58 are merely illustrative means to provide a quick release seal to insure that the fluid or solid content of a slurry moving from the receptacle 19 down the apron 24 will not be diverted to the sides of the screen unit between their side plates 30 and the frame side plates 26. The elements 56 and 58 may be releasably secured in any suitable fashion the details of which are not significant to an understanding of the invention. In the alternative, the sealing means may be integrated with the apron 24 with complementary sealing means being provided on the side plates 30 of the screen unit.

The invention embodiment as described is obviously simple to fabricate, assemble and to maintain.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect and the invention is therefore claimed in any of its forms or modifications within the legitimate and valid scope of the appended claims.

Having thus described my invention, I claim:

1. Dewatering and classifying apparatus for separating solids and/or liquids from a slurry type substance comprising a screen unit, frame means, means mounting said screen unit in connection with said frame means, said screen unit including a screen structure having a flow surface of trough-like configuration over which the slurry is passed in a stream-like flow, said flow surface being formed to provide for portions of the slurry to follow the contours thereof and to pass through said screen unit to its underside, said mounting means including means for pivotally hinging said screen unit to said frame means adjacent one end thereof, means providing a stop defining an inclined attitude of rest for said screen unit on said frame means and means at the other end of said screen unit for lifting and and swinging said screen unit upward and away from said attitutde of rest to expose the underside of said screen unit.

2. Apparatus as in claim 1 characterized by said screen unit including longitudinally extending side walls and bar segments transverse to and defining between said side walls a depressed flow surface of trough-like configuration.

3. Apparatus as set forth in claim 1 characterized by said hinging means including pivot elements connected with and projected laterally of said screen unit.

4. Apparatus as set forth in claim 2, characterized by said lifting means being disposed to have a portion thereof overlie said flow surface towards said other end of said screen unit.

5. Apparatus as in claim 1 wherein said mounting means includes suspension means having a pivot connection with the lower end of said screen structure in its position of rest on said frame means.

6. Apparatus as set forth in claim 1 characterized by said other end of said screen unit in its position of rest on said frame means constituting the upper end thereof and being bridged by handle means connected therewith.

7. Apparatus as set forth in claim 1 characterized by said screen unit being provided by upstanding side walls disposed to either side of said screen structure and the flow surface of said screen structure including successively disposed planar segments which lie in different planes, one being inclined to the other.

8. Apparatus according to claim 1 wherein said hinge means for said screen unit will, in a position of rest of said screen unit on said frame means, be positioned to the lower end of said screen unit and have in connection therewith means to effect bodily adjustment of said screen unit in a longitudinal sense corresponding to the orientation of the movement of a slurry across said flow surface.

9. Apparatus as set forth in claim 1 characterized by said frame means providing a support for said screen unit in a position of rest and including laterally spaced side plates slotted at the lower ends, and said mounting means for said screen unit including pin means at said one end thereof received in and projected through slots in the lower ends of said side plates and said mounting means for said screen unit further including means in connection with and releasable from said frame means and providing an extensible support including means hingedly and pivotally mounting said pin means to provide for an adjustable suspended type support for establishing a required orientation of said flow surface in the position of rest of said screen unit on said frame means.

10. Dewatering and classifying apparatus for separating solids and/or liquids from a slurry type substance, including a frame means providing a relatively elevated inclined apron onto which a slurry is discharged for screening, a screen unit positioned as an extension of said apron, said screen unit having upper and lower ends with respect to its orientation on said frame means and in the sense of slurry flow thereover from said apron, and means utilizing said frame means freely to support one end of said screen unit and pivotally to connect its other end whereby said screen unit may normally occupy a position of rest as a continuing surface beyond said apron and be susceptible of lifting from said position of rest in a swinging motion to expose an underside portion thereof.

11. Apparatus as in claim 10, wherein said means utilizing said frame means includes suspension means in connection with said frame means, said suspension means incorporating means to make longitudinal adjustments in the position of said screen unit on said frame means independently of the swinging motion thereof.

12. Apparatus as in claim 11 wherein said suspension means includes sleeve means on said frame means orienting in a position substantially parallel to an attitude assumed by said screen unit in its position of rest, eye bolt means slidably mounted in said sleeve means, and adjustable means selectively to limit motion of said eye bolt means in said sleeve means in one direction, said pivotally connected end of said screen unit providing pivot elements relatively rotatably interengaged with said eye bolt means.

13. Apparatus as in claim 12, characterized by a transversely orienting member comprised in said frame means marking a lower terminus of said apron and a stop means abutted by the upper end of said screen unit in the position of rest of said screen unit, the lower end of said screen unit being the pivotally connected end.

14. Dewatering and classifying apparatus for separating solids and/or liquids from a slurry type substance comprising a screen unit including a screen structure having a flow surface over which the slurry is passed in a stream-like flow, said flow surface being formed to provide for portions of the slurry to follow the contours thereof and pass through the screen unit to its underside, said screen unit being characterized by a trough-like configuration, a support structure for said screen unit including frame means, means in connection with one end of said screen unit for hinging thereof to said frame means, means on said frame means providing a mount for said hinging means accommodating the lifting and swinging of said screen unit to and from said frame means to expose its underside, said frame means providing stop means abutted by said screen unit in the swinging thereof about said hinging means to define an inclined position of rest for said screen unit on said frame means, said mounting means and hinging means providing a relatively adjustable connection of said screen unit to said frame means and said frame means being characterized by laterally spaced side plates slotted at the lower ends and the hinging means of said screen unit including pin means at the lower end of said screen unit received in and projected through the slotted lower ends of said side plates and said mounting means on said frame means including means releasable therefrom and connectable with said pin means for movement therewith to and from a connected relation to said frame means.

15. Apparatus according to claim 14 characterized by said stop means being a rigid cross member disposed between said side plates upwardly of the lower end thereof and serving as an abutment for the upper end of said screen unit in a position of rest on said frame means, and said frame means including portions thereof forming an upper extension of said screen unit in a position of rest thereof and receptacle means within said frame means, for receiving and guiding a slurry to move across the flow surface provided in said screen unit.

16. Apparatus according to claim 14 characterized by said stop means being a rigid cross member disposed between said side plates upwardly of the lower end thereof and serving as an abutment for the upper end of said screen unit in a position of rest on said frame means, and said frame means including portions thereof forming an upper extension of said screen unit in a position of rest thereof and receptacle means within said frame means, for receiving and guiding a slurry to move across the flow surface provided in said screen unit.

17. Apparatus according to the claim 16 characterized by means on one of said screen unit and said frame means to produce in the mount of said screen unit to said frame means a seal at the peripheral portions of said screen unit.

* * * * *